United States Patent [19]
Peck et al.

[11] 3,945,516
[45] Mar. 23, 1976

[54] VEHICLE LOAD LIFTING AND LOWERING APPARATUS

[75] Inventors: Albert William Peck; Reginald Stephen Richardson, both of Welwyn Garden City, England

[73] Assignee: John Ratcliff (Tail Lifts) Limited, England

[22] Filed: May 21, 1974

[21] Appl. No.: 472,038

[30] Foreign Application Priority Data
May 21, 1973   United Kingdom.............. 24157/73

[52] U.S. Cl........ 214/75 T; 214/DIG. 10; 214/77 R
[51] Int. Cl.² ........................................... B60P 1/46
[58] Field of Search...... 214/75 T, 75 H, 75 R, 660, 214/670–674, DIG. 10, 77 P

[56] References Cited
UNITED STATES PATENTS

| 747,899 | 12/1903 | Wall......................................... 187/9 |
| 3,233,758 | 2/1966 | Darfus .............................. 214/77 P |
| 3,700,123 | 10/1972 | Corley .............................. 214/77 P |
| 3,826,386 | 7/1974 | Taver ............................... 214/77 R |
| 3,826,392 | 7/1974 | Farley ................................ 214/672 |

FOREIGN PATENTS OR APPLICATIONS
99,672   8/1964   Denmark ........................... 214/672

Primary Examiner—Robert J. Spar
Assistant Examiner—R. B. Johnson
Attorney, Agent, or Firm—Young & Thompson

[57] ABSTRACT

A vehicle load lifting and lowering apparatus, which can be used as a vehicle tail lift to lift and lower loads of up to 8 tons between the level of the ground on which the vehicle stands and the level of the vehicle's load carrying deck, comprises a pair of parallel spaced apart guide columns which can be swung via a deformable articulated linkage towards and away from the vehicle. Runners slidably mounted in equal numbers on each column support between them a load carrying platform, and hydraulic rams power the runners (and hence the platform) up and down the columns during load lifting operations. An arm is secured to the guide column and each articulated linkage so as to be movable from a first, inoperative, position in which movement of the runners along the columns effects only raising or lowering of the load carrying platform, to a second position, in which the arm is locked to one of the links of the articulated linkage and projects into the path of movement of one of the runners so that powered sliding movement of the runners up the columns is transmitted to the linkage to move the guide columns towards or away from the vehicle. In the disclosed embodiment, there are two hydraulic rams, associated one with each guide column and each operable in two synchronized stages.

4 Claims, 4 Drawing Figures

VEHICLE LOAD LIFTING AND LOWERING APPARATUS

BACKGROUND OF THE INVENTION

The invention relates to vehicle load lifting and lowering apparatus.

1. Field of the Invention

The invention is particularly applicable to the form of such apparatus known as a vehicle tail lift.

2. Description of the Prior Art

Vehicle tail lifts in use at the present time are commonly designed to raise and lower loads of up to three tons on a vertically movable load carrying platform which overhangs the vehicle's rear wheels. If, as often happens, these wheels are the rearmost contact between the vehicle and the ground on which it stands, a load being lifted will tend to cantilever the lifting platform about the vehicle's rear axle. This tendency must be resisted by the vehicle chassis, which is thus placed under strain, and if a very heavy load is lifted, the strain could damage the vehicle.

SUMMARY OF THE INVENTION

The present invention sets out to provide a vehicle load lifting and lowering apparatus which can be used as a vehicle tail lift, and which can lift and lower loads of, for example, up to eight tons between the level of the ground on which the vehicle stands and the level of the vehicle's load carrying deck.

According to the invention, a vehicle load lifting and lowering apparatus comprises a pair of parallel spaced apart guide columns, two or more runners slidably mounted in equal numbers on each column and supporting between them a load carrying platform, means between the columns and the runners for effecting powered up and down sliding movement of the runners along the columns to raise and lower the platform, and a deformable articulated linkage, one end of which is pivotally connected to the guide columns and the other end of which may be pivotally mounted on the rear of a vehicle to locate the guide columns in a substantially upright position spaced apart transversely of an access opening to the vehicle, there being provided further means operable, by powered sliding movement of the runners in one direction along a predetermined length of the guide columns, to deform the linkage and swing the platform, the columns and the power operated means towards the vehicle access opening for storing there against, and operable, by powered sliding movement of the runners along a predetermined length of the guide columns in the opposite direction, to articulate the linkage in the opposite sense and swing the platform, the columns and the power operated means away from the access opening towards the ground on which the vehicle stands for load lifting purposes.

Said means for effecting powered up and down sliding movement of the runners on the columns may comprise a hydraulic ram, and in this case the ram is preferably designed for two stage operation. There may be provided two such rams, each associated with one of the guide columns, operable in synchronism.

The articulated linkage preferably comprises a pair of deformable parallelogram linkages associated one with each guide column.

Said further means may comprise an arm, secured to one link of the articulated linkage and movable from a first, inoperative, position in which movement of the runners along the columns effects only raising or lowering of the load carrying platform to a second position, in which the arm projects into the path of movement of a runner (or a part movable therewith) and constitutes a rigid extension of the said link, whereby powered sliding movement of the runners along the guide columns is transmitted, via interengagement of the said runner (or the said part) and the projecting arm, to the said link to articulate the linkage in either sense.

The said part may comprise a roller, mounted on the runner or movable therewith, and there may be provided two arms and two rollers associated one with each parallelogram linkage.

The invention includes within its scope a vehicle when fitted with a load lifting and lowering apparatus embodying the invention.

BRIEF DESCRIPTION OF THE DRAWINGS

One embodiment of the invention will now be described, by way of example only and with reference to the accompanying drawings in which.

DESCRIPTION OF THE PREFERRED EMBODIMENT

Figure 1:
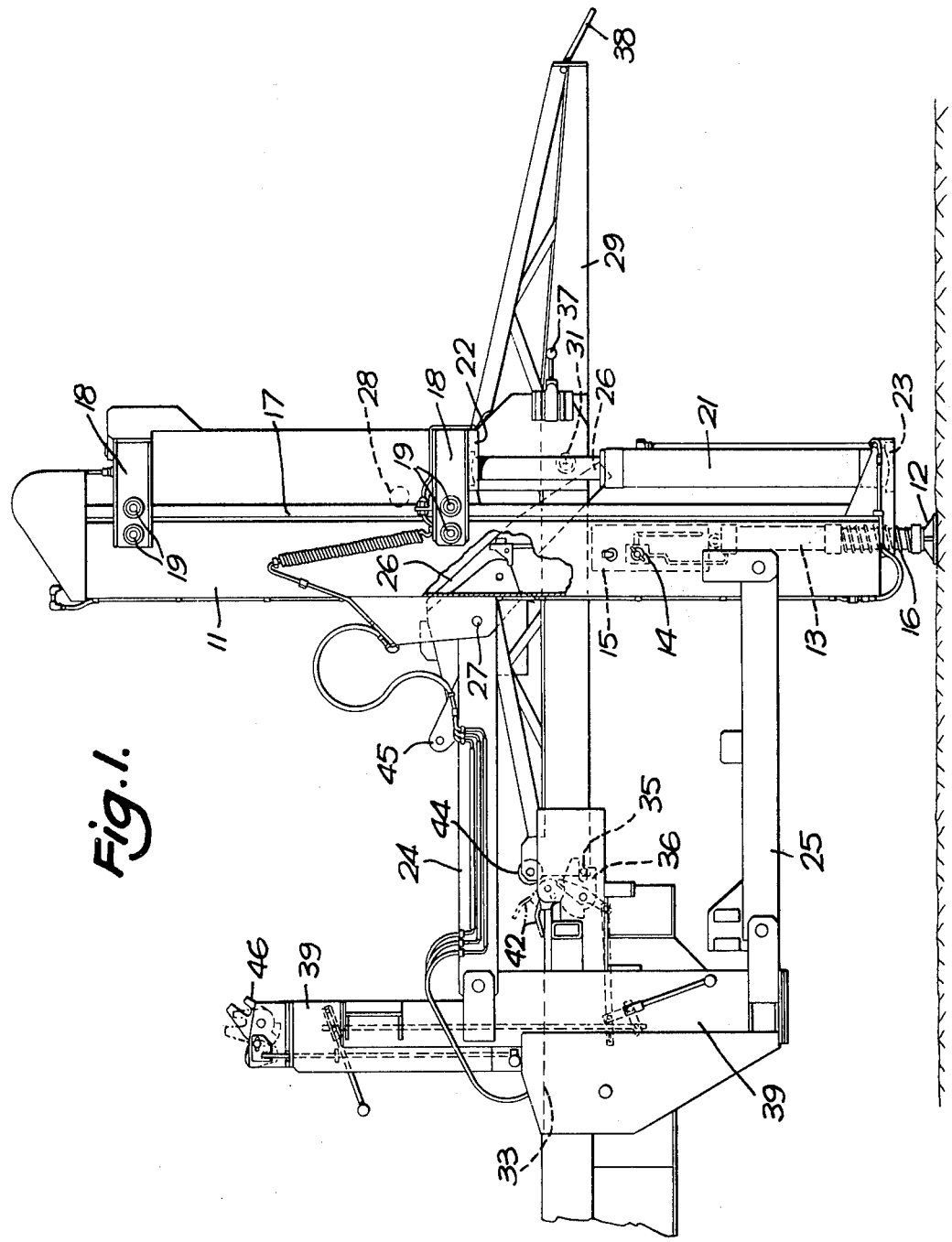
FIG. 1 shows, in side elevation and in a fully-opened position, a vehicle tail lift embodying the invention.
Figure 2:
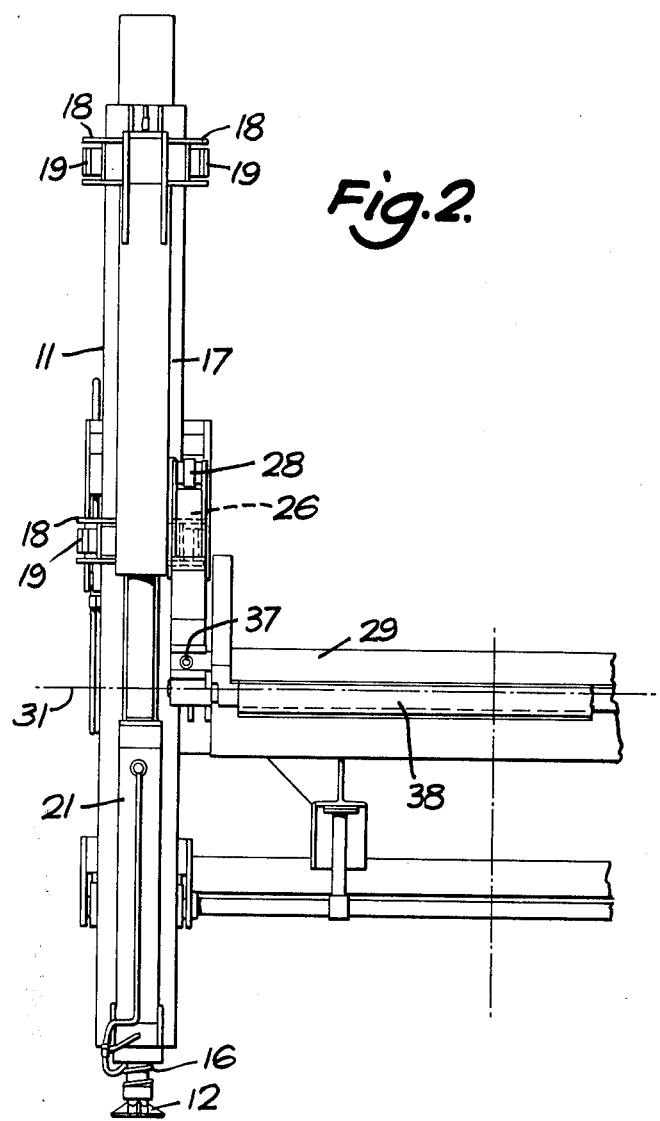
FIG. 2 shows in end elevation the tail lift of FIG. 1.

The tail lift shown in the drawings is fitted to the rear end of a heavy goods vehicle - which is not itself shown in any great detail.

The lift is powered by a hydraulic power-take-off pump (not shown), driven by the vehicle's engine and incorporating a governor which automatically matches the engine speed to the weight of any load lifted. Electrical controls for the lift are connected to the vehicle's batteries (not shown).

The lift comprises a pair of guide columns 11 which are fitted at their lower ends with support feet 12. Each foot 12 is connected to the piston of a hydraulic ram 13 co-axially housed inside the guide column 11. Hydraulic fluid is supplied to the ram 13 through a two-way valve 14 from a header tank 15, and a compression spring 16 is coiled about the axis of each support foot 12 as it extends from its associated guide column 11. The operation of these support feet will become apparent later.

Each guide column 11 is provided with a flanged guide rail 17 extending along its length, which acts as a guide for an associated runner 18. Each runner 18 is mounted on its guide rail by means of two sets of rollers 19 engaging on each side of the flange of the rail, and each upper set of rollers is free to pivot, as a unit, clockwise or anti-clockwise (as viewed in FIG. 1) so that the rollers remain in contact with the rail flange despite slack developing during use.

Figure 4:
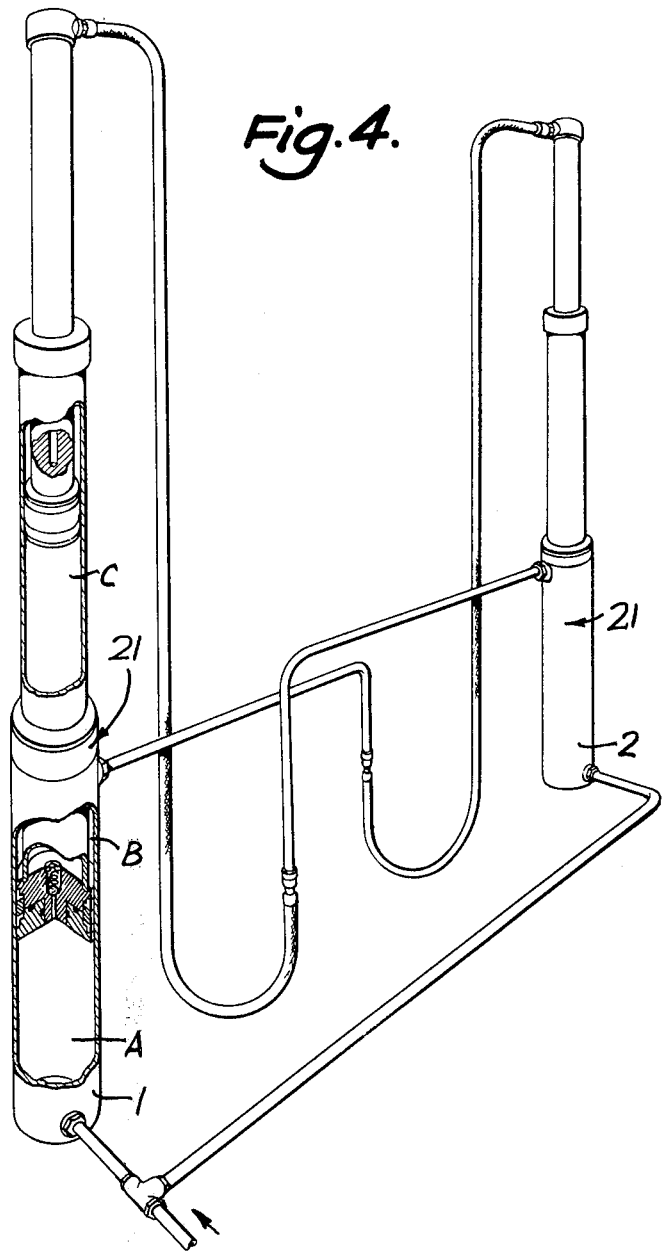
FIG. 4 shows diagrammatically the hydraulic supply system of the tail lift's rams.

A power operated, two-stage hydraulic ram 21 is associated with each guide column 11, and is mounted between the column 11 and its associated runner 18 to effect powered up and down sliding movement of the runner on the guide rail 17. The ram connections comprise a pivoted cross-head 22 at the runner and a spherical ended swivel pad bearing 23 at the bottom end of the column. FIG. 4 shows in greater detail the hydraulic interconnection of the two rams 21, one associates with each guide column 11, and their operation will shortly be described in conjunction with the use of the tail lift.

There is associated with each guide column 11 a deformable articulated parallelogram linkage, the two main arms 24, 25 of the linkage being pivotally connected at one end to the guide column 11 and at the other end to a supporting post 39 attached to the rear of the vehicle. An arm 26 is associated at the pivot 27 with one of the arms 24 of each linkage. The arms 26 are movable from a first position in which they are locked to their links 24 to hang vertically downwards, to a second position (shown in FIG. 1 in broken line) in which each arm 26 projects into the path of movement of a roller 28 which is fixed to each runner 18 and is thus movable with the runner. In this second position, the arm 26 is again locked, to constitute a rigid extension of its associated link 24.

A load carrying platform 29 is pivoted between the runners 18 on an axis 31. Manually operable locks 37 are provided between each runner 18 and the adjacent platform edge, and the platform can thus be locked to the runners to project substantially at right angles to the line of movement thereof and unlocked to balance horizontally about its pivot axis 31. The platform forms an apron, onto which loads to be lifted into the vehicle can be manoeuvred, and incorporates pivoted ramps 38 to guide the loads over the rear edge of the platform.

It will be appreciated from the FIGS. that the tail lift is mounted on the vehicle with the supporting posts 39 and guide columns 11 in a substantially upright position, spaced apart transversely of an access opening to the vehicle. The level of the vehicle's load carrying deck inside the opening is indicated in FIG. 1 by a broken line 33.

The tail lift operates in the following manner:

With the lift opened, the platform at ground level, and the arms 26 locked in their chain line positions, a load can be manoeuvred onto the load carrying platform 29 to straddle the platform pivot axis 31. The locks 37 are closed to lock the platform 29 to the runners 18. Actuation of the two-stage hydraulic rams 21 causes powered sliding upward movement of the runners 18 past the arms 26 along the guide columns 11, and the load can thus be lifted to the level 33 of the vehicle's load carrying deck. As this level is approached, projections 35 adjacent the inboard edge of the platform engage latches 36 on the supporting posts 39 to lock the platform in position against the edge of the vehicle's load carrying deck (FIG. 1). Engagement of these latches also causes automatic retraction of a barrier 42 spanning the access opening. The rams 21 are held in position under pressure, and the load can then be manoeuvred into the vehicle over the retracted barrier 42.

To lower the platform 29 to the ground again, the latches 36 are manually released and the rams 21 are depressurised to allow the platform 29 to sink to the ground. As the latch release levers are operated, the barrier 42 is automatically raised again to obstruct the vehicle's access opening.

Figure 3:
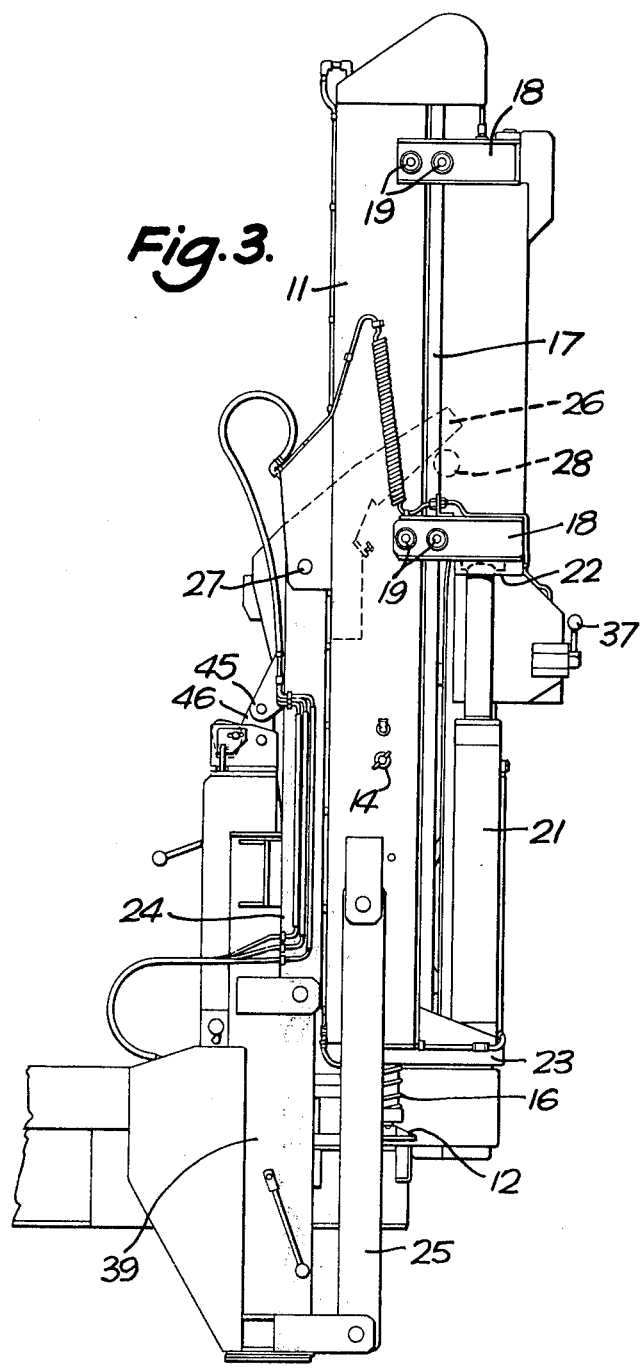
FIG. 3 shows the tail lift in a fully-closed position.

To close the tail lift against the supporting posts 39 for travelling purposes, from this position, each arm 26 is moved into its broken line position and is locked there, the platform 29 remains unlocked to balance about its pivot axis 31, and the rams 21 are again extended. Each roller 28 contacts the arm 26 which projects into its path, and the power of the rams is thus transmitted via the roller 28 and the arm 26 to the arm 24 of the linkage. The rams thus exert a torque in an anti-clockwise direction (as viewed in FIG. 1) about the pivots 27, counteracting the clockwise torque about these pivots caused by the weight of the columns 11, the rams 21 and runners 18, and the platform 29. Thus, continued upward movement of the rams will articulate the parallelogram linkages and swing the columns, the runners, the platform and the rams themselves in an arcuate path towards the vehicle's access opening. When this movement has been completed, the rams are in the position shown in FIG. 3 and the columns, the linkages and the platform are folded substantially flat against the supporting posts 39 at the rear of the vehicle.

As the columns 11 reach their final folded flat position, projections 45 on the arms 24 engage latches 46 on the supporting posts 39 to lock the columns finally in position against the posts.

During this operation, with the platform 29 balancing horizontally about its pivot axis 31, as the columns and other equipment approach the supporting posts 39 the inboard edge of the platform will contact the posts. Rollers 44 are provided on the inboard edge of the platform to cushion this contact, which then causes the platform to swing upwardly and anti-clockwise about its pivot axis, as the rams 21 continue to be extended, into a final folded flat position against the guide columns 11 and posts 39.

To open the tail lift and lower the columns 11 to the FIG. 1 position for load lifting operations, the latches 46 are manually released, the rams 21 are depressurised and, with the arms 26 locked in their broken line positions, the above sequence of events is reversed. As the support feet 12 contact the ground, the guide columns 11 come to rest on top of them. This contact is cushioned by the springs 16, and causes fluid to be forced out of the rams 13 through the opened valves 14 and back into the header tanks 15. With the columns 11 finally at rest, a pressurised hydraulic equilibrium is achieved and the valves 14 are then closed to fix the extension of the support feet 12 below the columns 11. Thus each support foot 12 is enabled to find its own level as the tail lift is opened, and the lift can thus operate to a certain extent on uneven ground.

When the tail lift is closed to swing the columns 11 towards the vehicle access opening for travelling purposes, the valves 14 are again opened in readiness for the next time the columns 11 are lowered to the ground.

The two-stage rams 21 operate as follows:

With reference to FIG. 4, chamber B is charged permanently with fluid and is linked via a supply line to chamber C on the adjacent ram cylinder, and vice versa. High pressure hydraulic fluid is fed into chamber A of both ram cylinders, which propels the first stage of both rams upward along the guide columns 11, in turn compressing the fluid in chambers B and hence chambers C, and thus extending the second stages of the rams at the same time and same velocity as the first stages.

This hydraulic system also compensates for uneven loading in either ram as follows:

Should cylinder 1 have a higher load imposed on it than cylinder 2, the piston in cylinder 1, chamber A senses the higher load in terms of fluid volume and the piston in cylinder 1, chamber C also senses the higher load — fluid is immediately transferred to chamber B of cylinder 2 and thence to chamber A of cylinder 2.

Thus, both cylinders demand the same feed volume at all times.

The electrical circuit of the tail lift incorporates limit switches on all locks to ensure that the sequence of operations is correctly carried out. Limit switches are also incorporated into the platform 29 which prevent the platform from being lowered fully to the ground on which the vehicle stands if the ground is so uneven as to cause unacceptable lateral twist, or horizontal droop, of the platform.

The hydraulic circuit of the tail lift incorporates safety valves so that, in the event of a leak or fracture in any line of the hydraulic circuit, pressure is automatically maintained to prevent the platform 29 failing during a lifting or loading operation.

Modifications may be made to the embodiment described above within the scope of the invention. For example, each support foot 12 could comprise a threaded cylindrical stub which is adjustable in a corresponding tapped bore formed in the bottom of its associated guide column 11. A locking collar could be provided to set the adjustment of the foot 12, with the end of the foot comprising a ball and socket connection to accommodate slight unevenness in the ground on which the column stands when in use.

We claim:

1. A vehicle load lifting and lowering apparatus comprising in combination:

a pair of parallel spaced apart guide columns, a plurality of runners slidably mounted in equal numbers on each of said columns, a load carrying platform supported between said runners, means between the columns and the runners for effecting powered up and down sliding movement of the runners along the columns to raise and lower the platform, a deformable articulated linkage, means pivotally connecting one end of said linkage to the guide columns, means pivotally connecting the opposite end of said linkage to the rear of a vehicle to locate the guide columns in a substantially upright position across the vehicle, and, further means responsive to powered sliding movement of the runners in one direction along a predetermined length of the guide columns, to deform the linkage and swing the platform, the columns and the power operated means towards the vehicle for storing thereagainst, and responsive to powered sliding movement of the runners along a predetermined length of the guide columns in the opposite direction, to articulate the linkage in the opposite sense and swing the platform, the columns and the power operated means away from the vehicle towards the ground on which the vehicle stands for load lifting purposes, wherein said further means comprise an arm, with means securing said arm to one link of the articulated linkage so as to be movable from a first, inoperative, position, in which movement of the runners along the columns effects only raising or lowering of the load carrying platform, to a second position, in which the arm projects into the path of movement of a part of one of said runners and constitutes a rigid extension of the said link, whereby powered sliding movement of the runners along the guide columns iss transmitted, via interengagement of the said runner and the projecting arm, to the said link to articulate the linkage in either sense.

2. The apparatus of claim 1, wherein said part comprises a roller, mounted on the runner so as to be movable therewith, and wherein there are provided two arms and two rollers associated one with each guide column.

3. The apparatus of claim 2, wherein said means for effecting powered up and down sliding movement of the runners on the columns comprise two hydraulic rams, each designed for two stage operation, each associated with one of the guide columns, and both operable in synchronism.

4. The apparatus of claim 3, wherein said articulated linkage comprises a pair of deformable parallelogram linkages associated one with each guide column.

* * * * *